United States Patent

[11] 3,569,824

| [72] | Inventor | Alois Ruse<br>Stierstadt (Taunus), Germany |
|---|---|---|
| [21] | Appl. No. | 670,684 |
| [22] | Filed | Sept. 26, 1967 |
| [45] | Patented | Mar. 9, 1971 |
| [73] | Assignee | Hartmann & Braun Aktienggsellschaft<br>Frankfurt am Main, Germany |

[54] CONDUCTIVITY PROBE HAVING A PAIR OF HELICALLY WOUND ELECTRODES
1 Claim, 2 Drawing Figs.

[52] U.S. Cl. ..................................... 324/30,
338/35
[51] Int. Cl. ................................... G01n 27/42
[50] Field of Search........................... 324/30, 30
(B), 65 (H), 65; 23/253; 204/1.1, 195, 272, 312;
338/35

[56] References Cited
UNITED STATES PATENTS
| 2,993,853 | 7/1961 | Berry | 204/195 |
|---|---|---|---|
| 3,014,858 | 12/1961 | Czuha | 204/195 |
| 2,240,693 | 3/1966 | Gardner | (324/30B) |
| 3,343,078 | 9/1967 | Shapiro | 324/30 |
| 3,237,139 | 2/1966 | Werner | 338/28X |
| 3,356,942 | 12/1967 | Bennett | 324/30X |
| 3,437,924 | 4/1969 | Tocanne | 324/61 |

*Primary Examiner*—Edward E. Kubasiewicz
*Attorney*—Franklin R. Jenkins

ABSTRACT: A conductivity cell having one or two interior cylindrical walls enclosing the fluid. The coaxial helical electrodes are secured along their spaced convolutions to either one wall, or, each of the electrodes to respective opposite walls, the convolutions being of wire and embedded in the wall material to a depth of about half a diameter of the wire. The number of coils is at least two to the cell. The materials of the wire and wall have essentially the same coefficients of thermal expansion.

PATENTED MAR 9 1971　　　　　　　　　　3,569,824

3,569,824

CONDUCTIVITY PROBE HAVING A PAIR OF HELICALLY WOUND ELECTRODES

BACKGROUND OF THE INVENTION

1. Field of the Invention

Conductivity cells having especially shaped electrodes.

2. The Prior Art

Conductivity cells are used to determine the specific electrical conductivity of fluids, often as an indication of fluid purity and may be connected in known manner into a Wheatstone bridge.

It is known that larger electrode plates produce correspondingly lesser difficulties due to polarization and that the relative positions of the electrodes should be kept fixed in order to achieve invariance of the cell constant for making conductivity measurements. The electrodes should be so firmly fixed that they cannot vibrate and that mechanical and thermal effects cannot produce even slight deformations. The best way of ensuring that these demands will be met is to attach the electrodes to the cell wall along the whole of their length. Such an arrangement has already been published.

Nevertheless, in cells in which the electrode plate surfaces are fairly large, an uncertainty factor remains, notwithstanding the fact that the whole length of each electrode is fused to the cell walls. Experience shows that even the slightest differences between the thermal coefficients of expansion of such electrodes and cell materials result over a period of time in the electrodes locally detaching themselves from the cell wall. With the naked eye, this often cannot even be seen. However, stresses which are always present in the material cause these very fine separations to form. If some of the liquid penetrates into the resultant gap between the cell wall and the electrode, a possibility which, because of diffusion and temperature effects is never quite absent, the cell constant will change. Moreover, a residual liquid may be carried from measurement to measurement when different liquids are measured consecutively or delays may occur during continuous measurement before the indication is correct. Since in practice complete agreement between the coefficients of expansion of the material of the cell wall and that of the electrode hardly ever exists, the risk of variation of the cell constant is always present for the above described reasons.

SUMMARY OF THE INVENTION

The present invention provides an electrical conductivity cell containing large surface electrodes, which is so constructed that normal differences between the coefficients of expansion of the cell wall and of the electrode material will not introduce the risk of local detachment of the electrodes from the cell wall. The conductivity cell according to the invention consists of a vessel made of a fusible material and containing two or more electrodes for contacting the liquid that is to be measured, said electrodes having the from of thin wire coils with relatively spaced convolutions which along the whole of their length are attached to the cell by fusing said coils onto or partly into the fusible cell material.

In the practical construction of a conductivity cell according to the invention the electrodes are preferably made of platinum wire and the convolutions of the wire and fused onto or partly into the internal wall surface of a cylindrical glass vessel.

In a modified form of construction at least one of the two electrodes may be fused into or partly into a cylindrical glass member provided in the interior of the glass vessel.

The coiled form of electrode in which neighboring convolutions are free and relatively spaced divides the electrode surface into narrow ribbons. The circular cross section of the electrode wire permits the effective electrode surface to exceed the overall dimensions of the coil. If the electrode wires are sufficiently thin, slight differences in the temperature coefficient of the wire and cell material will not cause the electrode to become detached from the cell and in practice it has been found that under these conditions thin wires can be fused onto or into the cell material to produce a completely tight bond. This intimate bond remains intact and no cracks appear in the cell wall, even when major temperature fluctuations occur.

DESCRIPTION OF THE PREFERRED EMBODIMENTS

Figure 1:
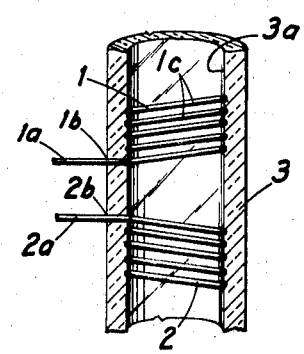
FIG. 1 is a longitudinal section of one embodiment of a conductivity cell according to the invention.
Figure 2:
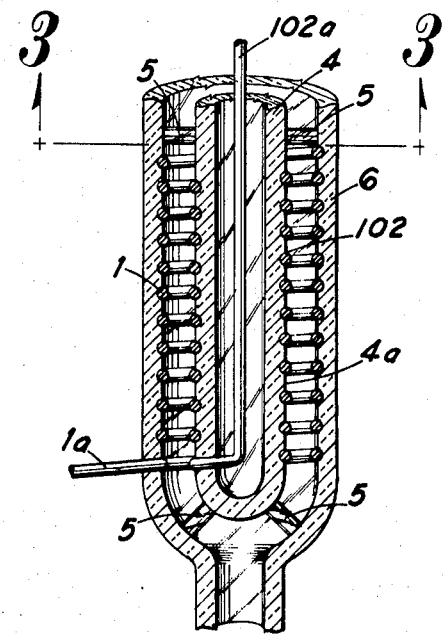
FIG. 2 is a section of a different embodiment.
Figure 3:
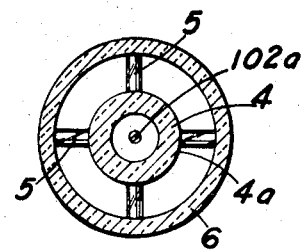
FIG. 3 is a transverse sectional view of the cell of FIG. 2 along the line 3–3 looking in the direction of the arrows.

The invention as shown in FIG. 1 includes upper and lower coaxial helical coils 1 and 2 as electrodes mounted in a section of open glass tubing 3. The fluid whose conductivity is to be measured may be held in a suitable container and the tube dipped into the liquid to a sufficient depth for the liquid to fill the tube section and rise above the upper coil so that the cell may be used as an immersion cell, or the liquid may flow through the tube as for a monitoring cell.

The coils 1 and 2 are of small wire, preferably platinum, because of general inertness and because thermal expansion of many glasses is essentially the same as that for platinum. In any event the material of the tube and that of the electrode should have essentially the same coefficient of expansion.

The coils are provided with suitable leads $1a$ and $2a$ passing to the tube as at $1b$ and $2b$ respectively. Each of the convolutions of the coils, e.g., convolutions $1c$, is embedded by fusion into the inner wall $3a$ of the tube to the depth of about half a diameter of the wire although there is no essential reason why the wire should not be embedded to a greater or lesser depth, but the wire is fusedly embedded continuously along the convolutions of each coil.

Those skilled in the art will be able to mount the coils in the tube as shown. The wire may be mounted spoollike on a small rod and inserted into the tube and fused onto the wall as the wire is unwound from the rod. By applying pressure to an increment of wire at the point of fusion the wire can be embedded.

The important thing is to make certain that each increment of the wire is fused to the wall.

In another form of the invention, rather than both coils being on one inner wall, one of the coils 102, having a lead $102a$, is fused into the outer wall $4a$ of a cylindrical glass support 4 coaxial and within the tube 6. The tube 6 carries the internal coil 1 in substantially the same manner as does the tube 3. Radial rods 5 maintain the support 4 and tube 6 in spaced relationship so that the coils 1 and 102 are separated and the test fluid may enter therebetween to contact both coils as it does in FIG. 1.

The convolutions may be of almost any pitch and spacing but preferably such that their total exposed area is approximately that of a cylindrical surface having the longitudinal length of the coil. Wire having a diameter of the order of one-tenth of a millimeter may be used, though the upper limit of the wire size depends on the relative heat expansion of the wire and glass (which should always be as near equal as possible) and the care taken in having the wire at the point of fusion the same temperature as that of the glass. The area of contact for a given depth of fusion varies with the diameter of the wire, while strength of the wire varies with the second power of the diameter. The finer the wire the less the chance of cracks, and especially any expansion of the wire toward the axis of the coil.

I claim:

1. An electrical conductivity cell for measuring the specific conductance of liquids comprising a container portion made up of inner and outer glass cylinders having, respectively, outer and inner walls to provide a zone therebetween for a liquid whose conductivity is to be measured, and two mutually insulatingly spaced bare electrodes in the portion and opposite each other for contacting the liquid, each electrode being in the form of a thin wire coil having convolutions spaced from each other, one electrode being fused onto said inner wall and the other electrode being fused onto the outer wall continuously along the entire length of a plurality of the convolutions of the respective electrodes thereby holding the convolutions insulatingly spaced from each other, the coefficient of thermal expansion of the wire of the electrodes and that of the glass being essentially the same to avoid danger of separation of the electrodes from, and cracking of, the walls on which the electrodes are fused.